(12) United States Patent
Depagter (10) Patent No.: US 7,581,917 B1
(45) Date of Patent: Sep. 1, 2009

(54) OVERHEAD CARGO RACK APPARATUS AND METHOD FOR PICKUP TRUCKS

(76) Inventor: Daniel A. Depagter, 2434 Camelot Blvd., Apt. C, Sheboygan, WI (US) 53081

( * ) Notice: Subject to any disclaimer, the term of this patent is extended or adjusted under 35 U.S.C. 154(b) by 486 days.

(21) Appl. No.: 11/374,564

(22) Filed: Mar. 14, 2006

Related U.S. Application Data (63) Continuation-in-part of application No. 11/065,625, filed on Feb. 25, 2005, now abandoned, which is a continuation-in-part of application No. 10/922,480, filed on Aug. 20, 2004, now abandoned.

(51) Int. Cl.
*B60P 9/00* (2006.01)

(52) U.S. Cl. ............. 414/462; 296/3; 224/321; 224/324; 224/405

(58) Field of Classification Search .......... 296/3, 296/7; D12/412, 414.1; 224/310, 321, 324, 224/402–405; 414/462–466
See application file for complete search history.

(56) References Cited

U.S. PATENT DOCUMENTS

| | | | |
|---|---|---|---|
| 4,728,244 A | | 3/1988 | Stokkendal |
| 4,953,757 A | * | 9/1990 | Stevens et al. ............. 224/310 |
| 5,505,579 A | * | 4/1996 | Ray et al. .................. 414/462 |
| 5,618,150 A | * | 4/1997 | Poindexter ................. 414/477 |
| 5,632,591 A | * | 5/1997 | Henriquez .................. 414/462 |
| 5,651,657 A | * | 7/1997 | Poindexter ................. 414/541 |
| 5,836,635 A | | 11/1998 | Dorman |
| 5,924,835 A | * | 7/1999 | Ross ......................... 414/462 |
| 6,176,674 B1 | | 1/2001 | Meeks et al. |
| 6,413,033 B1 | | 7/2002 | Monroig |
| 6,457,931 B1 | | 10/2002 | Chapman |
| 6,666,643 B1 | | 12/2003 | Heynssens |
| 6,676,220 B2 | * | 1/2004 | Mistler ....................... 298/1 A |
| 6,705,820 B2 | * | 3/2004 | Schilling .................... 414/462 |
| 6,712,247 B1 | | 3/2004 | Fox |
| 2004/0028511 A1 | * | 2/2004 | Eaton ......................... 414/462 |

* cited by examiner

*Primary Examiner*—Saúl J Rodríguez
*Assistant Examiner*—Jonathan D Snelting
(74) *Attorney, Agent, or Firm*—Robert T. Johnson

(57) ABSTRACT

Overhead cargo rack apparatus for pickup trucks is described and includes an electromechanical actuator jack mounted onto a tiltable cargo platform and the electromechanical actuator jack actuated by a reversible switch connected to a circuit breaker connected to the pickup truck battery to tilt the tiltable cargo platform, and cargo mounted on the cargo platform and the cargo platform with cargo mounted thereon balanced on a fulcrum and the tilting raising the front end of the cargo platform and cargo mounted thereon to then lower the rear of the cargo platform and cargo mounted thereon to be in a loading or unloading mode and as an alternate the tilting action can be done manually by pulling downward the rear end of the tiltable cargo platform with cargo mounted thereon, and the electromechanical actuator jack in disconnect mode, when the tiltable cargo platform with cargo loaded thereon is balanced on the fulcrum mount.

1 Claim, 9 Drawing Sheets

OVERHEAD CARGO RACK APPARATUS AND METHOD FOR PICKUP TRUCKS

REFERENCE TO PRIOR PATENT APPLICATION

This is a continuation-in-part (C-I-P) per 37 CFR 1.53(b) of patent application Ser. No. 11/065,625 filed Feb. 25, 2005, now abandoned which in turn is a (C-I-P) of Ser. No. 10/922,480, filed Aug. 20, 2004, now abandoned and having the same title and inventor/applicant Daniel A. Depagter, as this present application.

BACKGROUND OF INVENTION

Prior art cargo overhead pickup truck racks are rigid and difficult to unload, when used for hauling long cargo, such as wood planks, beams, piping, ladders and similar items. The difficulty of unloading can be overcome by tilting a cargo overhead platform rack upward at the front of the pickup truck box, to cause the rear of the cargo overhead platform rack to tilt downward at the rear of the pickup truck box, to allow for easy reach for rearward sliding, for manual removal of the cargo.

SUMMARY OF THE INVENTION

Adjustable tilt overhead platform rack apparatus, for trucks, particularly for pickup trucks, is disclosed and claimed, and includes rear corner pillars and front corner pillars in the pickup truck box, and the front corner pillars may support a fulcrum beam which is a tilt point for the overhead tiltable cargo rack platform apparatus, and tilting of the overhead rack apparatus actuated manually or by electromechanical jack actuator, also known as electromechanical jack, with built in limit switches for tilting the front of the overhead platform rack upwards on the fulcrum beam, and the rear of the overhead platform rack tilts downward from the fulcrum to thus lower the unloading point of the long cargo, which may extend over the cab of the pickup truck. By changing the location of the fulcrum point, long cargo, medium, or short cargo may be loaded onto the overhead cargo rack to be in good balance, thus tilting of the overhead cargo and tiltable cargo platform manually by pulling down on the overhead cargo extending at the rear of the pickup truck box thus not always requiring an electromechanical jack actuator for tilting the overhead cargo loaded rack.

PRIOR ART PATENTS

Prior art U.S. Patents are:
U.S. Pat. No. 4,728,244 for COMBINE ROOF RACK FOR CAR AND CART.
U.S. Pat. No. 5,836,635 for TRUCK RACK APPARATUS.
U.S. Pat. No. 6,176,674 for LOADING PICKUP TRUCK.
U.S. Pat. No. 6,457,931 for TRUCK MOUNTED HOIST.
U.S. Pat. No. 6,712,247 B1 for ROOF RACK.
U.S. Pat. No. 6,666,643 B1 for LOAD LIFTING APPARATUS FOR USE ON A VEHICLE.
U.S. Pat. No. 6,413,033 B1 for CARGO CARRIER FOR VEHICLE.

None of the above prior art patents individually would anticipate, or collectively make obvious this present invention

LEGENDS

| LEGENDS | DESCRIPTION |
| --- | --- |
| 1, 1' | Front vertical mounted pillars of pickup truck cargo rack frame. |
| 2, 2' | Rear vertical mounted pillars of pickup truck cargo rack frame. |
| 3 | Tiltable cargo platform. |
| 4 | Fulcrum axis bar for tiltable platform. |
| 5, 5' | Locking pin apertures. (upper limit) |
| 5'', 5''' | Locking pin apertures. (lower limit) |
| 6, 6' | Upper vertical travel limiter. |
| 7, 7' | Lower vertical travel limiter. |
| 8, | Electromechanical actuator jack. mounted on front of cargo rack. |
| 9 | Electric motor drive for electromechanical actuator. |
| 10 | Electromechanical actuator base attached to front cross beam of frame of cargo rack. |
| 11 | Electromechanical actuator jack rod. |
| 12 | Electromechanical actuator jack rod head attachable to tilt cargo load platform. |
| 13 | Tie bar connecting pillars 1, 1'. |
| 14 | Retractable lock bar to actuator rod head aperture. |
| 15 | Aperture guides for retractable lock bar. |

| LEGEND NO. | DESCRIPTION |
| --- | --- |
| 16 | Mounting plate fasteners. |
| 17 | Pickup truck |
| 18, 19 | Locking pins. (at upper limit.) |
| 18', 19' | Locking pins. (at lower limit) |
| 20, 20' | Tie bar attachment to pillars. |
| 21 | Reversible electric switch. |
| 22 | Pickup truck overhead cargo rack apparatus. |
| 23, 23' | Optional fulcrum mount apertures. |
| 24, 25, 26, 27, 28, 29 | Left side braces for overhead cargo rack apparatus as shown. |

| | -continued |
|---|---|
| 24', 25', 26', 27', 28', 29' | Right side braces for overhead cargo rack apparatus, not shown but are mirror images of left side braces. |
| 30 | Circuit breaker. |
| 31 | Electric power line from battery to circuit breaker. |
| 32 | Electric power line from circuit breaker to reversible switch. |
| 33 | Long length cargo. |
| 34 | Electric power connection from reversible switch to electromechanical actuator motor. |

Figure 11:
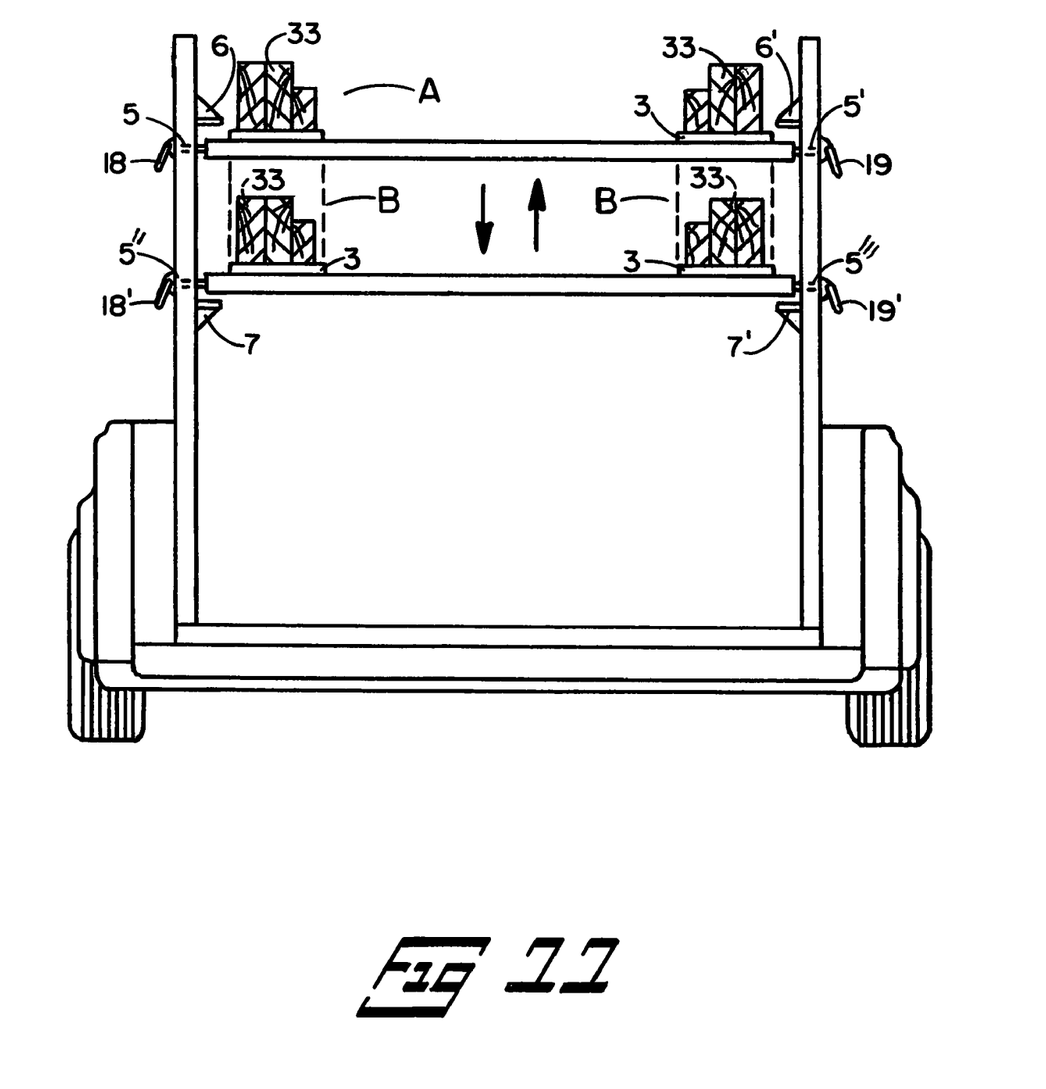
FIG. 11 Rear elevation view of pickup truck and cargo rack apparatus mounted therein showing up and down movement of cargo rack platform (A) in upper transit mode, (B) in lower unloading mode.

| LEGEND | DESCRIPTION |
|---|---|
| 35 | Front beam of cargo tilt rack |
| 36 | Knob or ell handle on lock rod 14. |
| 37 | Mounting plate for electromechanical actuator jack. |
| 38, 38' | Wrap around strap or belt. |
| A | Segment of FIG. 11; (in transit mode) |
| B | Segment of FIG. 11; (in unloading or loading mode) |

DETAILED DESCRIPTION OF THE INVENTION

Figure 1:
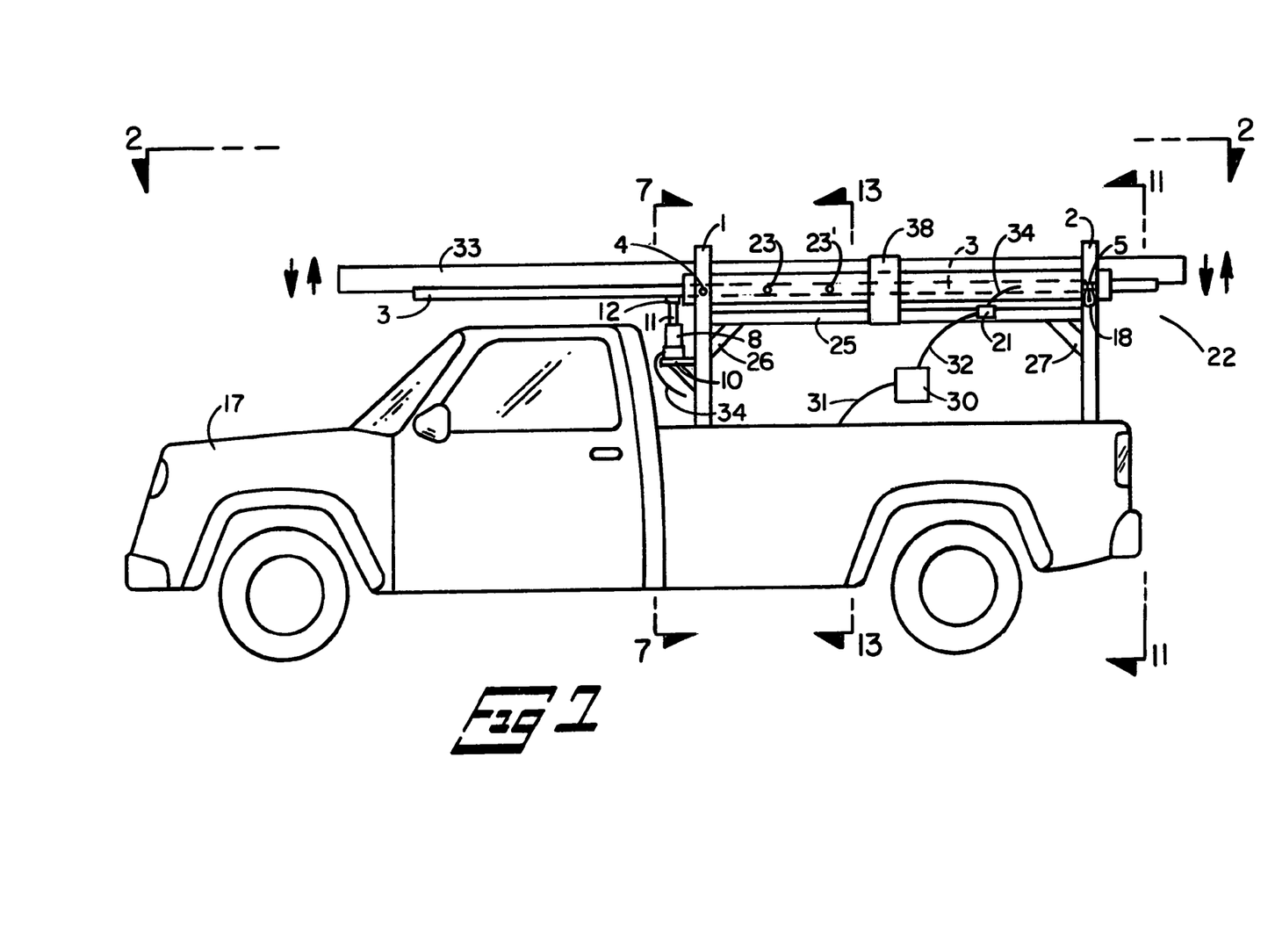
FIG. 1 Left side elevation view of pickup truck and overhead cargo hauling rack.

A pickup truck is quite limited in regard to the size of the cargo that can be loaded on such a truck, and to obviate this limit, disclosure and claims are made in this patent application to a pickup truck overhead cargo hauling rack apparatus 22, as shown in FIG. 1 showing cargo hauling apparatus for long lengths of cargo to extend over the roof of a pickup truck 17.

Figure 12:
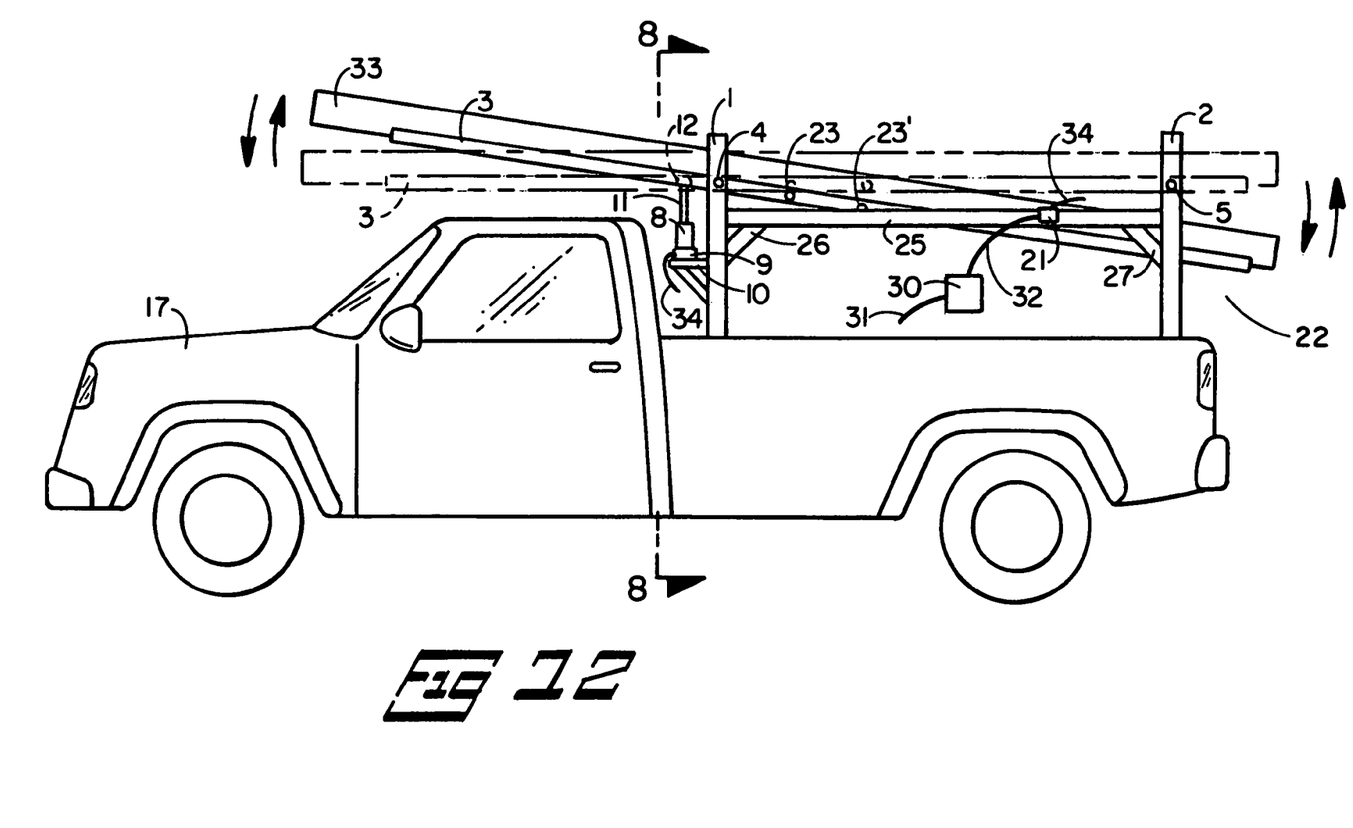
FIG. 12 Left side elevation view of pickup truck and cargo rack platform in unloading mode FIG. 13 Rear elevation view cargo rack apparatus mounted in pickup truck box from FIG. 1.

FIG. 1 is a left side elevation view of pickup truck 17 and pickup truck overhead cargo hauling rack 22, and long length cargo 33 extending over the cab roof of the pickup truck 17, and the whole assembly is in transit mode. Reference is now made to FIG. 12, left side elevation view of the pickup truck 17, and pickup truck overhead cargo hauling rack apparatus 22 in unloading mode.

Figure 2:
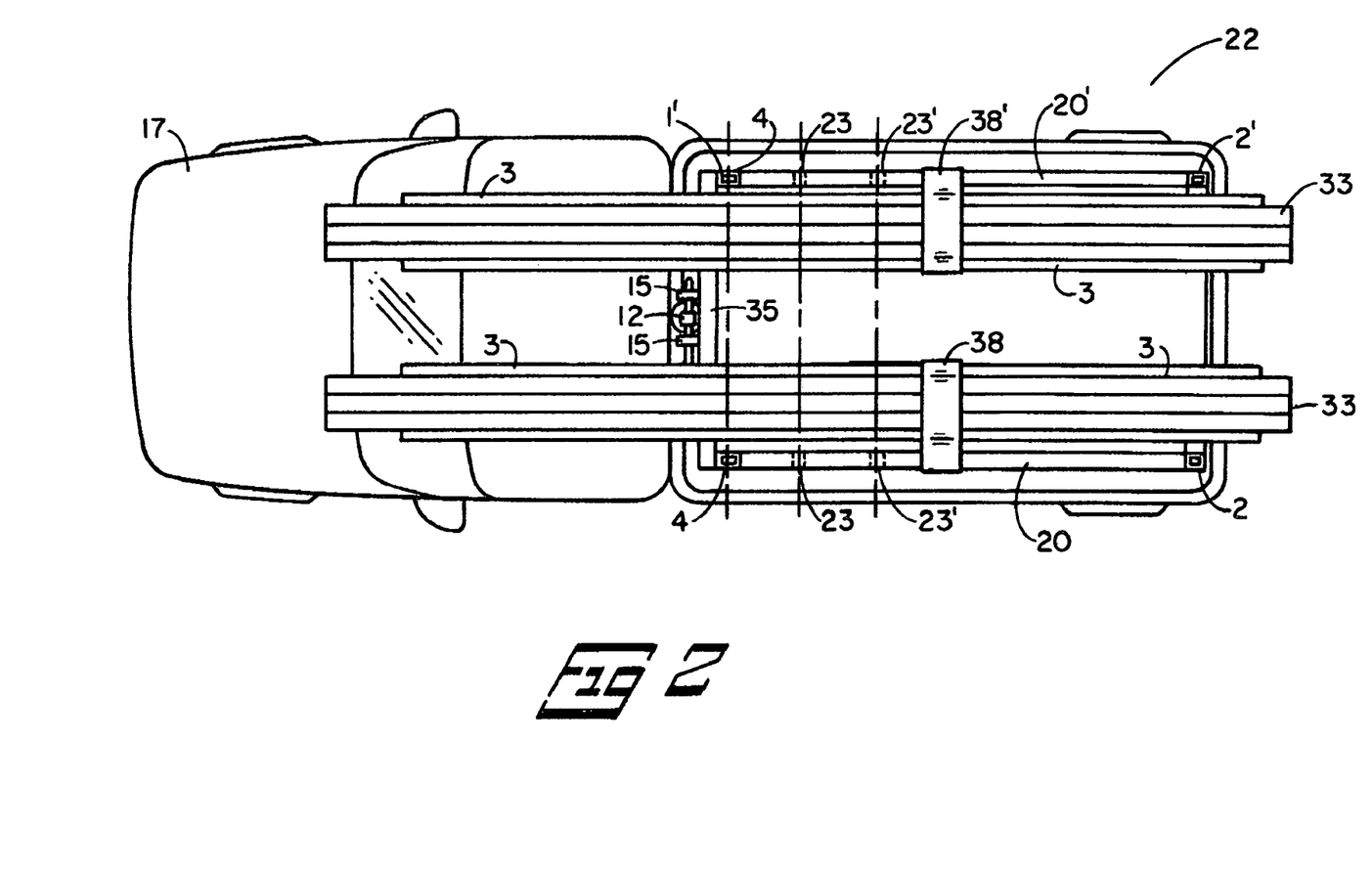
FIG. 2 Overhead plan view of pickup truck and overhead cargo hauling rack.

Referring to FIG. 2, which is a plan view of the pickup truck 17 and the pickup truck overhead cargo hauling rack apparatus 22, and long length cargo 33, extending over the top of the pickup truck 17 and alternate fulcrum axis locations 4, 23 and 23'. Legend 35 is the front beam of tiltable cargo platform tilt rack 3, and as an alternate to changing the fulcrum axis locations an electromechanical actuator or jack 8 is mounted on tie bar 13 connecting front vertical mounted pillars 1, 1' mounted in the front corners of the pickup truck 17 box, and the electromechanical actuator rod head 12 attachable to front beam 35 of tiltable cargo platform 3. Rear vertical mounted pillars 2, 2' of pickup truck cargo rack frame 22 are mounted in the rear corners of the box pickup truck 17. Pillar 1 is connected to pillar 2 and pillar 1' is connected to pillar 2' by tie bar attachments 20 and 20' respectively and tie bar attachments 20 and 20' provide apertures for mounting of alternate fulcrums 4, 23, and 23' for tiltable cargo platform 3.

Figure 3:
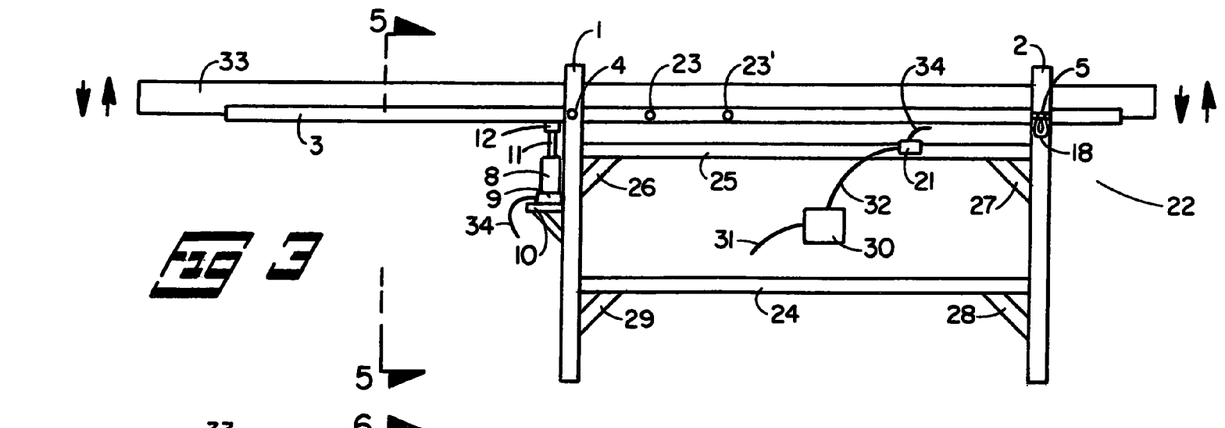
FIG. 3 Left side elevation view of cargo hauling rack in transit mode. (Pickup truck not shown)
Figure 4:
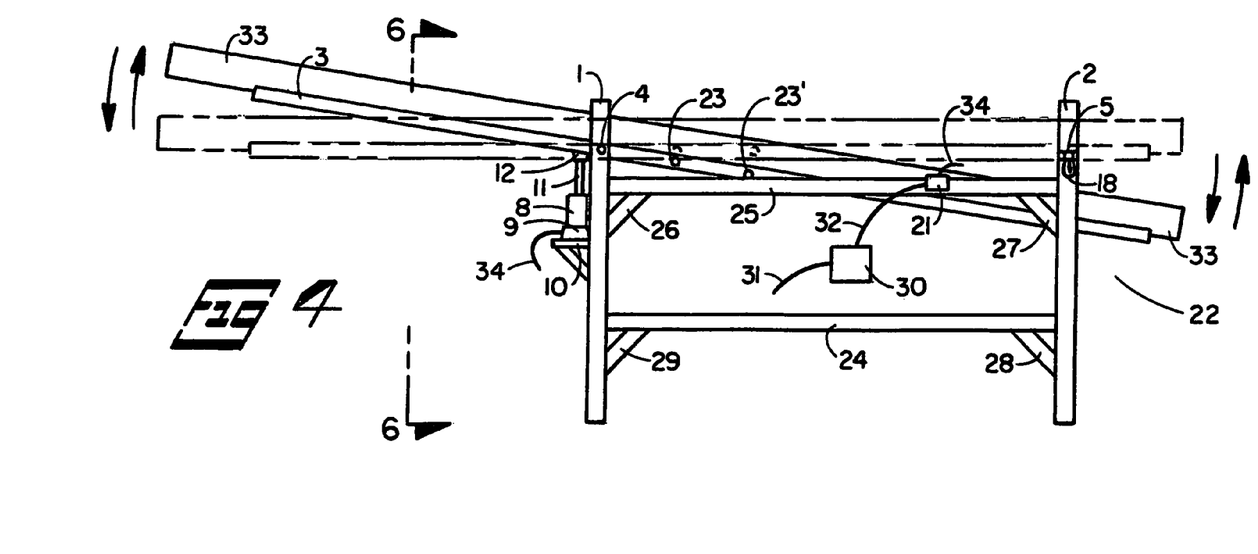
FIG. 4 Left side elevation view of cargo hauling rack platform in tilted position for unloading mode. (Pickup truck not shown)

FIGS. 3 and 4 show left side elevation view of pickup truck overhead cargo rack apparatus 22 isolated from the pickup truck, FIG. 3 showing cargo rack 22 in transit mode and FIG. 4, showing the tiltable cargo platform 3 in tilt position or unloading mode, with the rear of the cargo rack tilted downward for unloading of the cargo 33 with the front of the cargo rack tilted upwards. This tilt is shown by the up-down arrows at FIG. 3 and FIG. 4.

The electrical components of electric power line 31 from pickup truck battery (not shown) to circuit breaker 30, and electric power line 32 from circuit breaker 30, to reversible electric switch 21, and electric power connection 34 from reversible electric switch 21 to electric motor drive 9 for electromechanical actuator jack 8. The electric circuitry apparatus described above is shown only on the left side of the assembly, but may be mounted in any other area of the apparatus. The right side of the pickup truck overhead cargo rack 22, is a mirror image of the left side shown, except for the electric apparatus shown and described.

Figure 7:
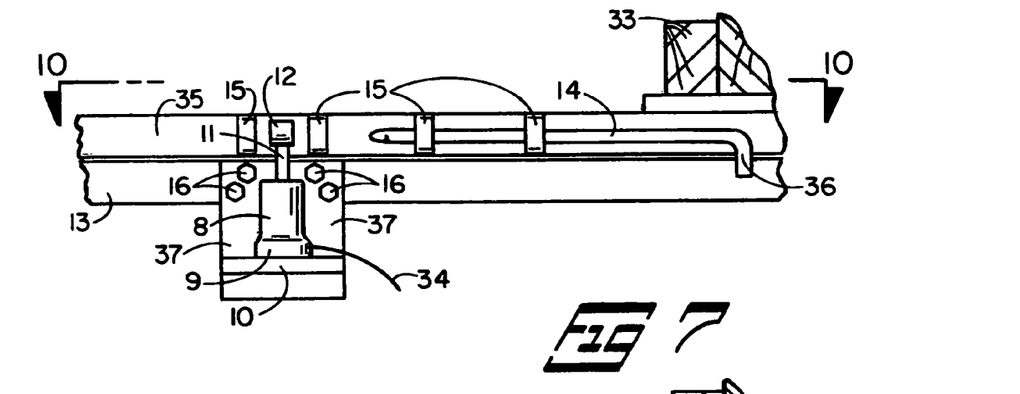
FIG. 7 Enlarged elevation view of front end of cargo hauling rack in locked transit position. From FIG. 5.
Figure 8:
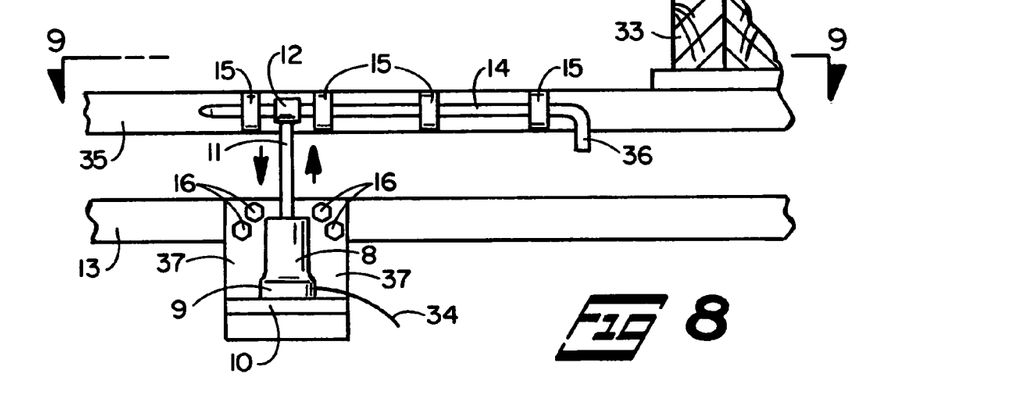
FIG. 8 Enlarged segment of FIG. 6 showing cargo rack in tilt position

The electromechanical actuator jack 8, which can also be called an electromechanical jack, is shown mounted in front of tie bar 13 connecting pillars 1 and 1' as shown in enlarged elevation views in FIG. 7 which is a cross section elevation view from FIG. 1 showing pickup truck cargo rack platform 3, in transit mode. FIG. 8 is a cross section elevation view from FIG. 12 showing pickup truck rack platform 3, in tilted unloading mode. As shown in FIG. 7 mounting plate 37 is attached to tie bar 13 connecting pillars 1 and 1' and electromechanical actuator 8 mounted on the mounting plate 37 and electromechanical actuator base 10 attached to mounting plate 37, and electric motor drive 9 for electromechanical actuator jack 8, connected to electric power connection 34 from reversible electric switch 21. The electromechanical actuator jack rod head 12, connected to electromechanical actuator jack rod 11, is connected to front beam 35 of tiltable cargo platform 3, and this connection made, when desired, by sliding retractable lock bar 14 through aperture of electromechanical actuator jack head 12 for tilt positioning of the cargo platform 3 as desired. The electromechanical actuator jack rod head 12 connected to electromechanical actuator jack rod 12, is connected to front beam 35 of tiltable cargo platform 3, and this connection made w by sliding retractable lock bar 14 through aperture guides 15, and through an aperture in electromechanical actuator head 12 for tilt positioning of the cargo platform 3 as needed, by closing reversible electric switch 21, to actuate the electromechanical actuator jack rod 11 The electromechanical actuator head 12, connected to sliding lock rod 14 which has a knob or ell 36 as a handle for sliding back and forth as needed to lock electromechanical actuator rod head 12 onto tiltable cargo platform 3.

The electromechanical actuator rod head 12 is connected to front beam 35 of tiltable cargo platform 3, and this connection made, when desired, by extending retractable lock bar or rod 14 through aperture guides 15 and through aligned aperture in rod head 12 for tilt positioning of the cargo platform 3.

FIG. 7 shows the retractable lock bar or rod 14 in disconnect position, while FIG. 8 shows the retractable sliding lock rod 14 in connect position for actuator rod head 12 to tilt the tiltable cargo platform 3

Figure 9:
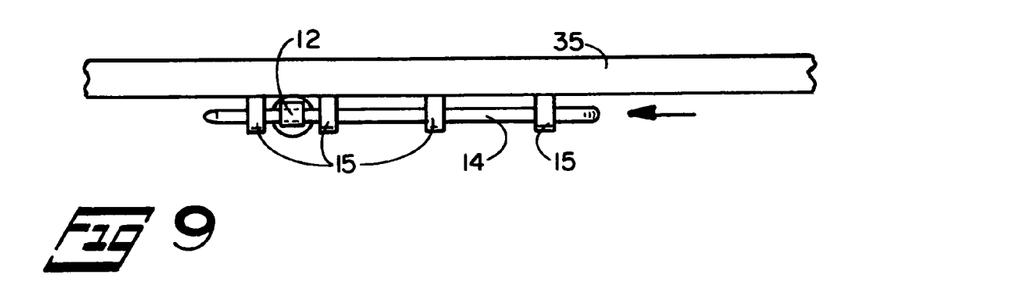
FIG. 9 Plan view of enlarged segment of FIG. 8, showing lock pin in lock position.
Figure 10:
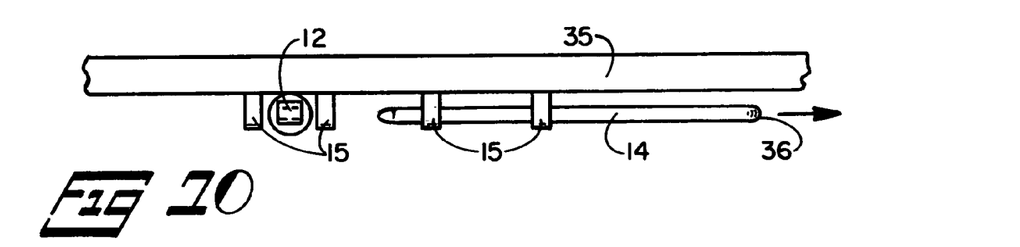
FIG. 10 Plan view of enlarged segment of FIG. 7 showing lock pin withdrawn from lock position.

FIG. 9 is an enlarged plan view from FIG. 8, showing retractable lock bar 14 extending through aperture in actuator rod head 12 for tilting cargo platform 3. FIG. 10 is an enlarged plan view from FIG. 7 showing retractable lock bar 14 in withdrawn position from aperture in electromechanical actuator head 12.

Figure 5:
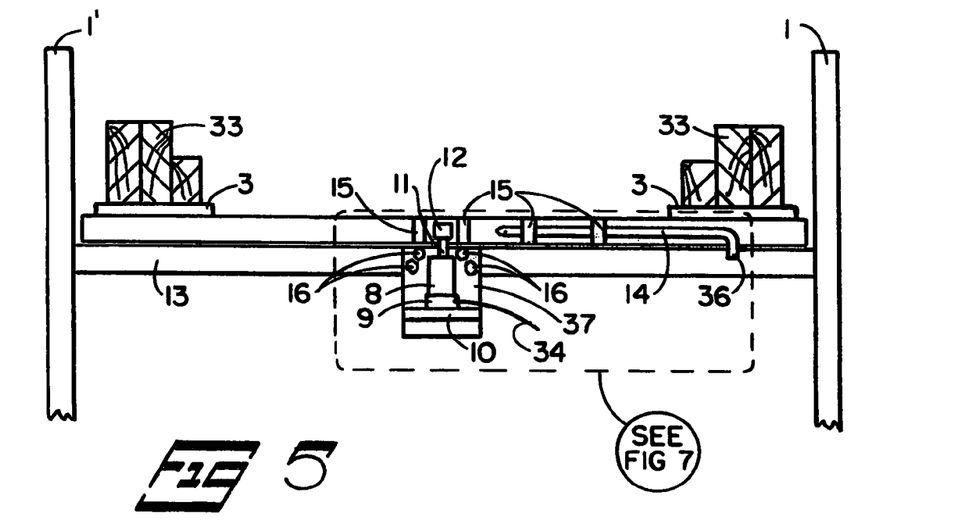
FIG. 5 Cross section elevation view of front end of cargo hauling rack platform in transit mode.
Figure 6:
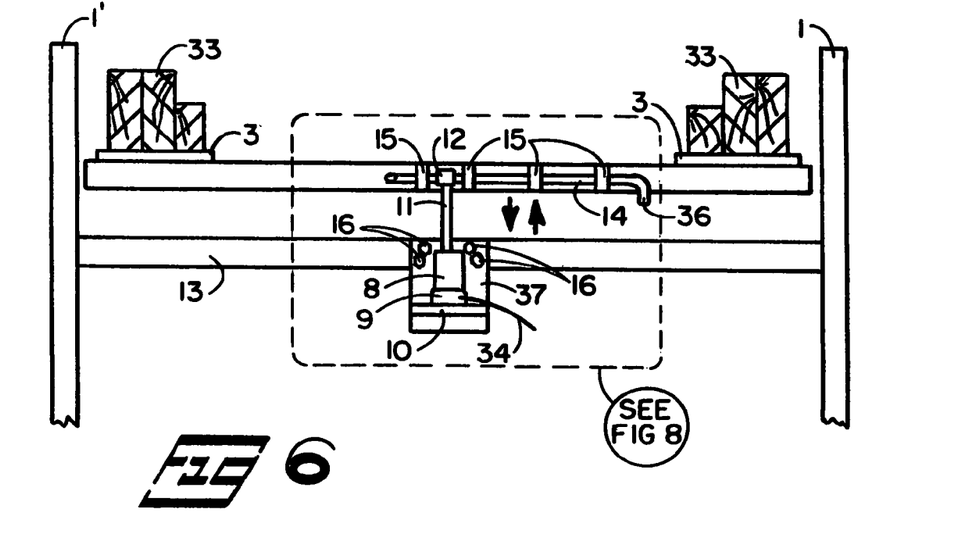
FIG. 6 Cross section elevation view of front end of cargo hauling rack platform in tilted unloading mode.
Figure 13:
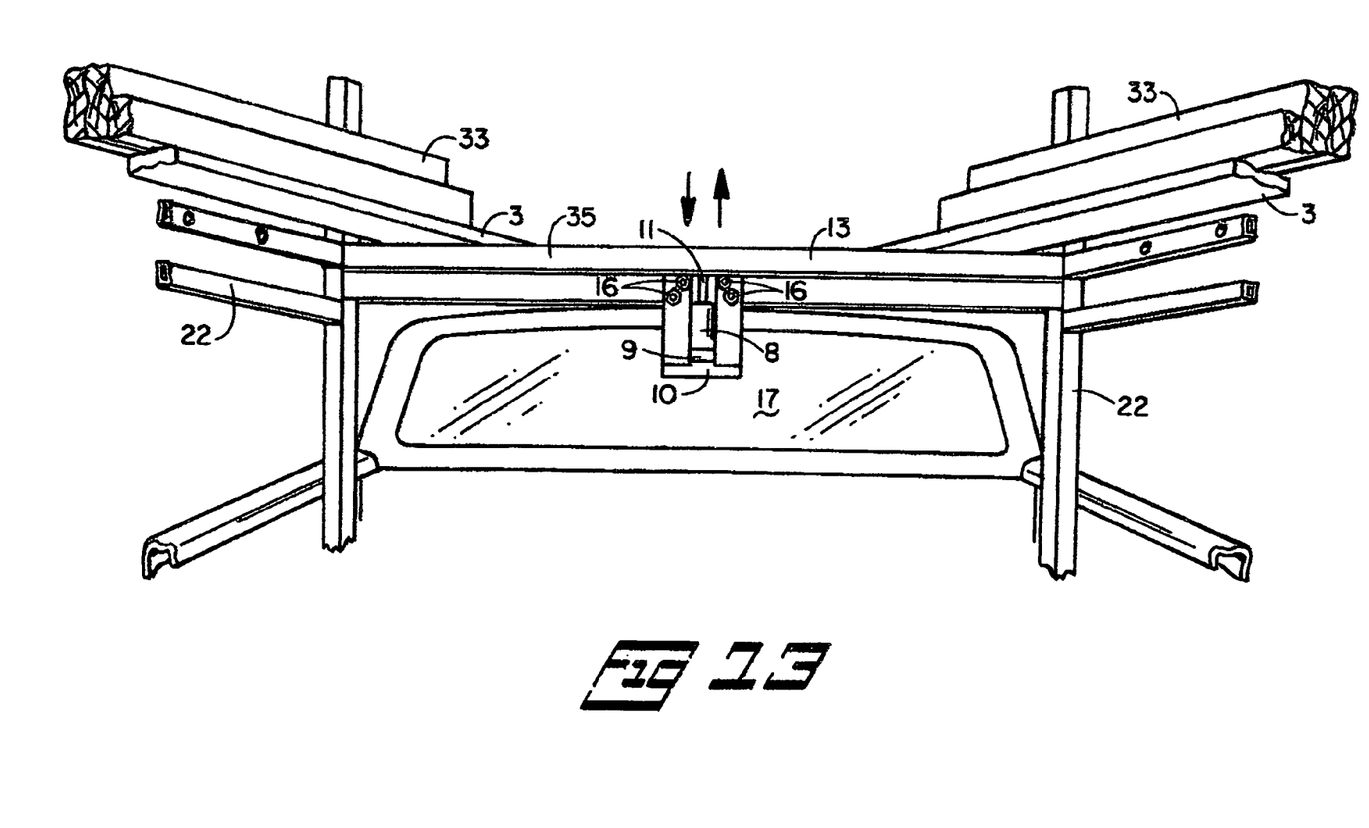

FIG. 5, is a cross section elevation view of front end of cargo rack platform in transit mode (from FIG. 3), and FIG. 6 is cross section elevation view of front end of cargo rack in tilted unloading mode. FIG. 11 is a rear elevation view of pickup truck 17, and pickup truck overhead cargo rack apparatus 22 mounted in box of pickup truck 17 and showing up and down movement of tiltable cargo platform 3, "A" is in up transit mode, and "B" is in down unloading mode of long length cargo. FIG. 13 is elevation view of back of cab of pickup truck 17 with tiltable cargo platform 3 apparatus mounted in box of pickup truck 17.

Figure 14:
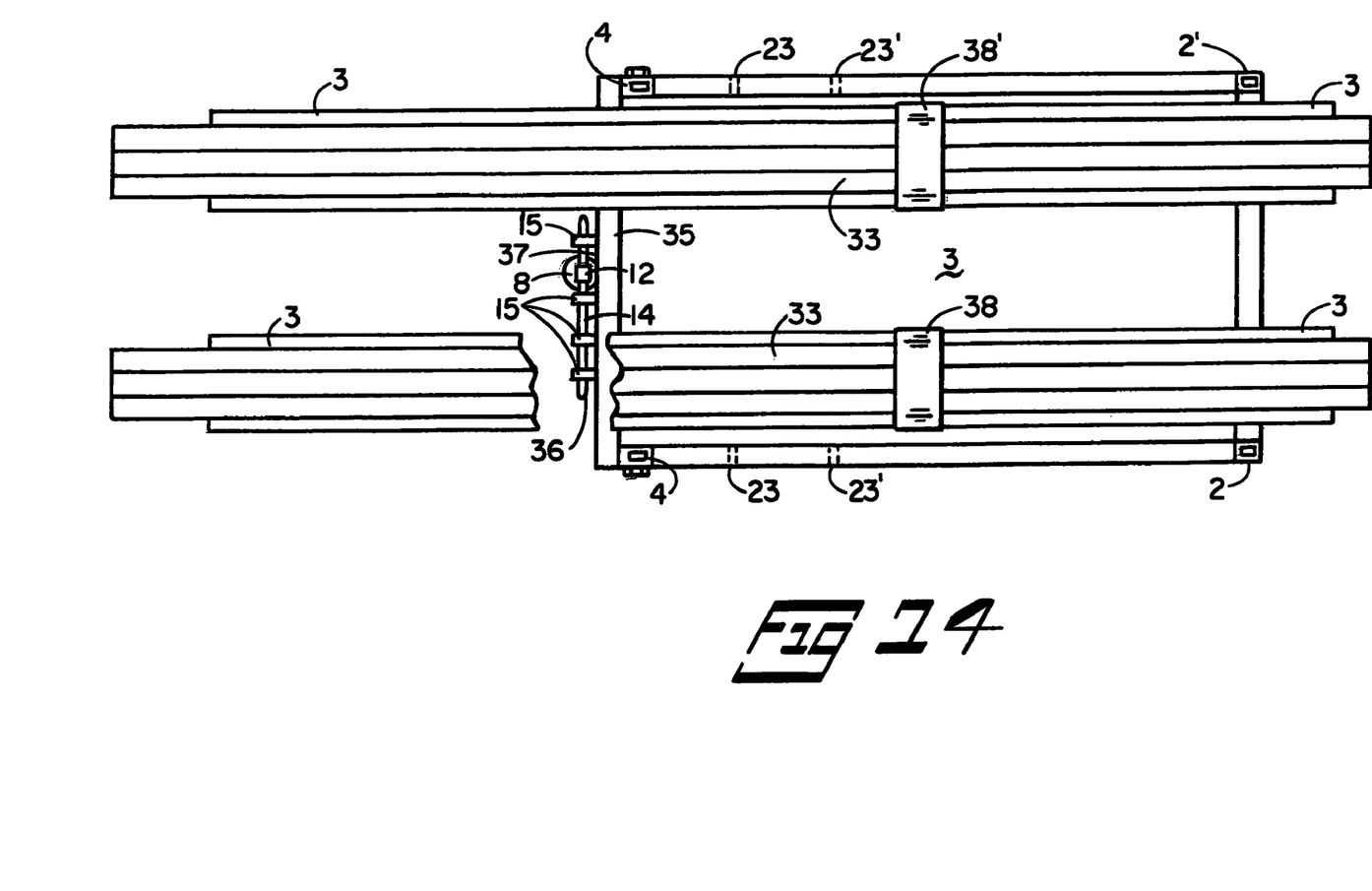
FIG. 14 Isolated plan view of cargo rack and platform.

FIG. 14 is a plan view of pickup truck overhead cargo rack apparatus 22, and showing wrap around belts or straps 38, and 38' to firmly hold the long length cargo 33, onto tiltable cargo platform 3, while in transit mode. See FIGS. 1 and 2, to further show wrap around belts or straps 38 and 38'.

Locking pins 18 and 19 (see FIG. 11) are, inserted in locking pin apertures 5 and 5' to lock tiltable platform 3 in transit mode in the upper position at upper vertical travel limiters 6 and 6' as shown in position "A". Lower vertical travel limiters 7 and 7' limit downward movement of tiltable cargo platform 3 as shown in position "B".

Mounting plate fasteners or bolts 16 are shown for attaching mounting plate 37 to tie bar 13 connecting pillars 1 and 1'. Referring now to FIGS. 3 and 4 legends 24, 25, 26, 27, 28, and 29 are braces shown on the left side of the pickup truck overhead cargo rack apparatus 22, and right side braces 24'. 25', 26', 27" 28', and 29' are right side braces for overhead cargo rack apparatus are not shown but are mirror images of the left side braces. The braces as shown, may be altered depending on the strength required due to cargo weight.

It is to be pointed out that electromechanical actuator jacks, as supplied by DUFF-NORTON CO. CHARLOTTE, N.C. 28241 are suitable for this invention. The electromechanical actuator jack may be further identified as electric motor driven screw jacks.

As an alternate a hydraulic cylinder may be used to replace the electromechanical actuator jack of this invention, in which case a valve controls the fluid to the hydraulic cylinder, instead of an electric switch as described above.

Legends 38 and 38' identified as "wrap around straps or belts" is shown in FIGS. 1, 2, and 14, and these wrap around straps or belts wrap around the cargo 33 and tiltable cargo platform 3, and also tie bar attachments 20, 20' which connect to vertical pillars 1, and 2, and 1' and 2' respectively, for transit to and from loading and unloading locations. The wrap around straps or belts 38, 38' are removed prior to set up of the loading or unloading mode at a job site. The wrap around straps or belts 38, 38' may be of woven nylon fiber, leather, rope, chain or wire.

The long length cargo 33, is loaded on the tiltable cargo platform 3, and the platform 3 with long length cargo 33 load is balanced on fulcrum axis bar 4, or optional fulcrum mount apertures 23 or 23' for manual tilting of the tiltable cargo platform by pulling downward manually the platform 3 and cargo 33 at the rear of the pickup truck 17 box, and this manual action of tilting manually bypasses the use of the electromechanical actuator jack 8 mounted in front of the cargo rack 3, as described above, and as shown in FIG. 1.

The term "transit mode" as used in this description means going to and from job sites with the cargo in horizontal position, as shown in FIGS. 1 and 2, with wrap around straps or belts 38, 38' in position to hold the cargo safely while in transit. FIG. 12 shows the tiltable cargo platform 3 in tilted, loading or unloading mode.

I claim:

1. An overhead cargo rack apparatus for pickup trucks, consisting of:
    a—front vertical pillars mounted in front corners of a box of the pickup truck,
    b—rear vertical pillars, mounted in rear corners of said box of said pickup truck,
    c—a tiltable cargo platform and said tiltable cargo platform resting on a fulcrum axis bar,
    d—front end of said tiltable cargo platform attachable to rod head of an electromechanical actuator jack mounted on tie bar connecting said front vertical pillars mounted in said front corners of said box of said pickup truck,
    e—said fulcrum axis bar connecting said front vertical pillars mounted in said front corners of said box of said pickup truck,
    f—an electric power line from battery of said pickup truck, to a circuit breaker and said power line from said circuit breaker to a reversible switch, and said power line extending from said reversible switch to said electromechanical actuator jack mounted on said tie bar connecting said front vertical pillars and
    g—a limit switch mounted in said electromechanical actuator jack,
    h—upper vertical travel limiters and lower travel limiters mounted on said rear vertical pillars mounted in said rear corners of said box of said pickup truck and,
    i—wrap around straps or belts wrapped around said tiltable cargo platform said cargo and tie bar attachments to said front vertical pillars and said rear vertical pillars, for in transit mode.

* * * * *